United States Patent [19]
Hedberg

[11] Patent Number: 5,948,984
[45] Date of Patent: Sep. 7, 1999

[54] STRUCTURAL INTEGRITY RECOVERY SYSTEM

[76] Inventor: Carl Vance Hedberg, 10543 Teakwood Way, Adelanto, Calif. 92301

[21] Appl. No.: 08/867,581

[22] Filed: Jun. 2, 1997

[51] Int. Cl.[6] .................................................. G01D 21/00
[52] U.S. Cl. ............................................. 73/588; 73/801
[58] Field of Search ............................ 73/767, 788, 598, 73/600, 587, 588, 801

[56] References Cited

U.S. PATENT DOCUMENTS

| | | | |
|---|---|---|---|
| 3,823,603 | 7/1974 | Couture | 73/615 |
| 3,986,389 | 10/1976 | Mesina | 73/614 |
| 4,004,454 | 1/1977 | Matay | 73/631 |
| 4,014,208 | 3/1977 | Moore et al. | 73/769 |
| 4,057,049 | 11/1977 | Hill | 73/570 |
| 4,128,011 | 12/1978 | Savage | 73/579 |
| 4,195,530 | 4/1980 | Ross et al. | 73/644 |
| 4,502,041 | 2/1985 | Penzien | 340/532 |
| 4,549,437 | 10/1985 | Weins et al. | 73/587 |
| 4,663,727 | 5/1987 | Saporito | 73/638 |
| 4,799,167 | 1/1989 | Sarr | 73/610 |
| 4,956,999 | 9/1990 | Bohannan et al. | 73/587 |
| 5,121,628 | 6/1992 | Merkl | 73/570 |
| 5,195,046 | 3/1993 | Gerardi et al. | 73/659 |
| 5,479,825 | 1/1996 | Williams et al. | 73/644 |
| 5,515,733 | 5/1996 | Lynnworth | 73/861.27 |
| 5,526,694 | 6/1996 | McEachen et al. | 73/594 |
| 5,567,881 | 10/1996 | Myers | 73/629 |
| 5,798,458 | 8/1998 | Monroe | 73/587 |

FOREIGN PATENT DOCUMENTS

| | | | |
|---|---|---|---|
| 4492118 | 7/1985 | Germany | 73/612 |
| 4180811 | 6/1977 | Japan | 340/566 |
| 5142916 | 3/1991 | Japan | 73/799 |
| 5331855 | 7/1994 | Japan | 73/625 |

Primary Examiner—Max Noori

[57] ABSTRACT

An apparatus and method for testing the structural joints in steel buildings is described. The invention provides electromechanical test units fixed at the joints of a building and permanently wired to a test apparatus such as an ultrasonic test monitor. Such a monitor may be one of many that are in communication with a central monitor and test management computer so as to accomplish wide spread testing of many buildings immediately after an earthquake by remote access.

8 Claims, 1 Drawing Sheet

STRUCTURAL INTEGRITY RECOVERY SYSTEM

BACKGROUND OF THE INVENTION

1. Field of the Invention

This invention relates to structural inspection, more particularly to the testing of buildings for structural integrity of joints such as welded joints for the anticipation of weld failure. The knowledge of such integrity becomes very important immediately after an earth upheaval such as a natural quake or other disturbances such as a terrorists event such as a bombing, foundation settlement or unexpected dead loads imposed above the engineered calculations for a building or structure.

2. Description of Related Art

The following art defines the present state of this field:

Weins et al., U.S. Pat. No. 4,549,437 the present invention relates to a method for acoustic testing of multiple segment complex structures for detecting changes in the integrity of such structures to anticipate failure. The method of the present invention in its simplest form requires providing each segment of a complex multiple segment structure with at least one acoustic sensor, recording the intensity and frequency distribution of the acoustic waves sensed by such acoustic sensor, and finally comparing the acoustic waves that are sensed either against a standard, over time, and/or from one segment of the complex multiple segment structure to another segment of the complex multiple segment structure.

Penzien, U.S. Pat. No. 4,502,041 describes an offshore drilling tower has at least one upright hollow member extending from below the water to support an above-water platform. A detector in or on the hollow member, usually below the water, responds to a water leak into the hollow member. The detector includes a signal generator responsive to pressure or chemical effect of the water. The detector is effective when actuated by water intrusion into the hollow member and into contact with the detector to send a signal of a unique or distinct frequency through the member itself to a signal receiver, preferably on the platform. The receiver is tuned to the distinct frequency and is effective upon receipt of such signal to afford an indication that the detector has been actuated by a water leak at a particular location. Variously tuned signal generators can be located within and without the tower on different ones of the hollow members, so that each, when energized, actuates a comparably tuned receiver on the platform, thus affording unique indications of various leak locations.

Myers, U.S. Pat. No. 5,567,881 describes an inspection apparatus and associated method includes a sensor housing defining an internal cavity in which a sensor is at least partially disposed for inspecting the surface of a structural part and for detecting defects in the surface and the substructure of the part. The inspection apparatus; includes a plurality of compliant fibers extending outwardly from a first end of the sensor housing and circumferentially about an opening defined by the first end of the sensor housing. The compliant fibers support the sensor housing above the surface of the part and maintain the sensor in a predetermined position relative to the surface of the part. The plurality of compliant fibers are adapted to flex laterally to accommodate obstructions on the surface of the part, such as raised fasteners, doublers or lap joints while maintaining the sensor in the predetermined position relative to the surface of the part. Consequently, the sensor can continue to acquire accurate signals which indicate the presence of structural defects in the surface and the substructure of the part as the inspection apparatus moves over the obstructions which protrude upwardly from the surface of the part.

Hill, U.S. Pat. No. 4,057,049 describes an apparatus and methods for the examination of specimens, particularly human tissue in vivo, by pulse-echo ultrasonic methods. To compensate for the variable and unpredictable attenuation of examining signals when reflected from different targets within the specimen, the echoes are processed—for instance by frequency analysis—to produce at least two sets of echo-amplitude information. These sets of information are in turn processed to produce a quantity indicative of the attenuation actually undergone by signals in examining each particular target. This quantity may then be applied to the "A"-scan, "B"-scan or other displays of the echoes of the examining signals to compensate them for the effects of varying attenuation, The apparatus may also include similar uncompensated displays and displays directly representing the attenuation coefficients of the regions of tissue under scan; comparison of these with the compensated displays may reveal further useful information.

Merkl, U.S. Pat. No. 5,121,628 describes an ultrasonic detection system having a flat faced radiator for providing a narrow beam of ultrasonic energy with minimal dispersion. The system includes an ultrasonic transmitter and receiver unit coupled to an ultrasonic transducer for producing ultrasonic energy. The system also includes a planar radiator and a coupling device between the ultrasonic transducer and the planar radiator. An encapsulating member surrounds the ultrasonic transducer for damping ultrasonic energy transmitted by the transducer in all but one direction. The encapsulating member is also coupled to the planar radiator in areas of the planar radiator that are not coupled to the coupling means. The encapsulating member has an area of increased density immediately adjacent to the planar radiator for damping the ultrasonic energy in areas of the planar radiator that are not directly coupled to the coupling means. This results in an ultrasonic detection system that radiates a relatively narrow beam of ultrasonic energy and in which the encapsulating IS member is relatively decoupled from the ultrasonic energy. The flat radiating face makes the ultrasonic detection system ideally suited for applications such as level detection and particularly where the radiator must be exposed to sterilizing procedures.

Savage, U.S. Pat. No. 4,128,011 describes a method and apparatus for the investigation of the soundness of structures of various kinds are disclosed. A method which involves the transmission of a vibration wave through the structure in question and the detection of the frequency spectrum of vibration response at selected investigations. Explanation is given of the adaptation of this method to the continuous monitoring of periodic investigation of structures, with particular reference to offshore oil and gas platforms, to deteriorating concrete structures and components, and to existing bridges, tunnels and railway track systems. A number of elongate gauges for extending longitudinally of selected critical members of an offshore structure below the waterline to monitor its structural integrity and performance are also describes.

Mesina et al., U.S. Pat. No. 3,936,389 describes an apparatus for the ultrasonic pulse-echo inspection of moving metal strip having a defect signal gate and a back wall signal gate adjusted to provide a back wall signal gate interval of fixed width and a fixed delay between the closing of the defect signal gate and the opening of the back wall signal gate is provided with means for automatically varying the time of closing the defect signal gate in response to changes in the relative position in time of the back wall signal with respect to the back wall signal gate interval so as to keep that gate interval in coincidence with the back wall.

Couture, U.S. Pat. No. 3,823,603 describes an ultrasonic nondestructive test system as described which includes signal attenuation means. The system includes a transducer, a transmitter and a receiver for displaying on a cathode ray tube defects or other discontinuities in the workpiece. An attenuator circuit is coupled before the receiver and is gated on and off at predetermined times and especially if a receiver has been adjusted to a high gain for detection of small defects beneath the surface of the workpiece. After the receiver receives part of its initial interface return signal, portions of the initial interface signal are abruptly attenuated by gating the attenuator.

McEachern et al., U.S. Pat. No. 5,526,694 describes an electronic measuring instrument measures and records the acceleration frequency spectra of a multi-story building while it is excited by wind. Such frequency spectra are indicative, in part, of building structural stiffness. When a traumatic structural event occurs, such as an earthquake, an explosion, or a hurricane, changes in wind-excited frequency spectra are used to detect hidden structural damage to the building.

Matay, U.S. Pat. No. 4,004,454 describes an automatic distance amplitude correction device for automatically correcting for amplitude variations and signals caused by the attenuation of sound propagating through a test specimen wherein a signal is transmitted through a test specimen and the reflection is detected and furthermore, a through signal is detected after the signal has passed through the test specimen only a single time and utilized to provide improved automatic distance amplitude compensation.

Sarr, U.S. Pat. No. 4,799,167 describes nondestructive ultrasonic testing systems and methods include data processing capabilities which allow time division multiplexing of several transducer channels by a smaller number of gates for signal processing, and time division multiplexing the outputs of the gates for subsequent evaluation.

Williams, U.S. Pat. No. 5,479,825 describes an improved ultrasonic energy transducers each include a material contacting member secured to a piezoelectric element at an interface region between oppositely operated first and second regions of the piezoelectric element. The material contacting member intensifies and amplifies movement of the interface region as the first and second regions of tile piezoelectric element operated in a push-pull mode relative to the interface region. The first and second regions of the piezoelectric element can be electrically driven to move the material contacting member for transmission of ultrasonic energy or mechanically driven by the material contacting member for receipt of ultrasonic energy. A variety of piezoelectric elements can be used in the improved transducers including, for example generally rectangular bars and discs segmented into two or more portions. A variety of material contacting members can also be used including, for example, a cylindrical stud and a more narrow dowel.

Bathmann, U.S. Pat. No. 4,492,118 describes a plate stock of uneven and variable thickness is tested for defects by means of ultrasonics whereby the zone adjacent the front surface and up to a depth of the minimum plate thickness is detected conventionally, but under utilization of a novel method the zone of variable thickness adjacent the rear wall is tested by detecting any echo in a gating period that is gating period during which either none or the rear wall echo will occur and in the latter case the setting up of the supplemental gating period is interpreted as having resulted from the presence of a defect (for example, echo 12) so that the occurrence of the rear wall echo 9 within the supplemental gating period is registered as an indication of a defect.

Takuro, Japan, 5.142.916 describes a method and apparatus for inspecting rupture initiation in an article. While a load is applied to the article repetitively, an elastic wave is monitored by an elastic wave sensor which converts it into an electric signal. The electric signal is fed to a signal transmission device having a capacity of transmitting low-frequency components of the electric signal. The transmitted electric signal is divided into successive signal segments. The successive signal segments are averaged to produce an averaged signal waveform informing the presence of a rupture initiation in the article.

Tadashi, Japan, 4,180811 describes a detecting device for destructive vibration of structures wherein detected vibration is converted into electric signal and an alarm is actuated when signal amount reaches at least one of a predetermined counting value and integration value is provided. The converted vibration signals are amplified, a high level signal in such amplified signals is detected and amplified by a high level detector, a high level output of this detector is counted by a counter to generate a counter output when the predetermined counting value is reached, and the alarm is actuated whenever at least one of the counter output and integration output is provided.

Moore, U.S. Pat. No. 4,014,208 describes an ultrasonic system for measuring dimensional change in a structural member, and particularly change in a fastener due to tensile stress, utilizes means for double pulsing a transducer to transmit an acoustic pulse into the member at one end for reflection from its other end with a period between paired pulses selected to cause the second echo received of the first pulse to coincide with the first echo of the second pulse. A VCO is employed with a digital counter to time the period between paired pulses, the interval between successive paired pulses, and the time of a predetermined number of pulse pairs. The latter timing is used to alternatively shift the frequency of the VCO high and low to cause the first echo of the second pulse to be offset in phase from the coincidence position it might have at the central frequency. Phase detection and integration of the echo pulse coincidence during alternatively high and low frequency offsets produces a phase-sensitive feedback signal to the VCO to drive its central frequency toward precise coincidence. Comparing the central frequency, f, with an initial frequency, $f_o$, for the unstressed condition of the member yields a measurement of its stress. The change ($f_o \rightarrow f$) is compared with a predetermined value, .DELTA.f, while stressing in order to adjust stress to that value. Initial and final conditions may be stored for comparison with subsequent stress measurement data.

Saporito, U.S. Pat. No. 4,663,727 describes an ultrasonic inspection system for inspecting areas of tubular members and providing a display of any internal flaws therein. In order to operate in a confined work space a probe containing ultrasonic transducers is provided together with a rotational and axial drive scanner which is linked to a remotely controlled manipulator. The scanner uses a wand supporting the probe at the upper and thereof. The manipulator locates the probe and scanner in alignment with the tube to be inspected. A stepping motor on the scanner drives the wand and the probe axially to a location just above the area to be inspected. A second stepping motor rotates the wand to enable the probe to perform a circumferential scan. The axial stepping motor rotates the wand towards the lower edge of the area and another circumferential scan occurs. The indexing and circumferential scanning proceeds until the entire area is scanned. The signals received from the ultrasonic transducers are digitized and processed, with the aid of programmed digital computer, so as to graphically display the interior interface of the sleeve and tube which is scanned to show any voids as may be due to incomplete bonding between the sleeve and the tube.

Ross, U.S. Pat. No. 4,195,530 describes an ultrasonic flaw detector for detecting irregularities in an object, such as a pipe, having a segment of annular cross-section. The detector includes a transducer with an involute transmitting surface for sending ultrasonic signals into the object at equal non-radial angles of incidence. The detector further includes a transmission apparatus for maintaining a constant physical relationship between the transducer and the pipe and interpretive apparatus for correlating reflections of ultrasonic signals within the object with irregularities.

Myers, U.S. Pat. No. 5,567,881 describes an inspection apparatus and associated method which includes a sensor housing defining an internal cavity in which a sensor is at least partially disposed for inspecting the surface of a structural part and for detecting defects in the surface and the substructure of the part. The inspection apparatus includes a plurality of complaint fibers extending outwardly from a first end of the sensor housing and circumferentially about an opening defined by the first end of the sensor housing. The complaint fibers support the sensor housing above the surface of the part and maintain the sensor in a predetermined position relative to the surface of the part. The plurality of complaint fibers are adapted to flex laterally to accommodate obstructions on the surface of the part, such as raised fasteners, doublers or lap joints while maintaining the sensor in the predetermined position relative to the surface of the part. Consequently, the sensor can continue to acquire accurate signals which indicate the presence of structural defects in the surface and the substructure of the part as the inspection apparatus moves over the obstructions which protrude upwardly from the surface of the part.

Lynnworth, U.S. Pat. No. 5,515,733 describes transducers that are mounted in a housing or vessel to propagate signals along a fluid measure path, and a plurality of massive elements are placed between transmitting and receiving transducers in the acoustic propagation path through the solid body of the housing or vessel to remove crosstalk. In a preferred embodiment, the elements are rings, or sleeves which are attached to, or are machined from a thicker cylinder to leave a thin-walled cylinder with alternating masses. An isolation structure lightly sandwich flange between O-rings. This structure may be formed with flanged transducer casings, allowing the transducers to be closely spaced in solid conduits or on rigid frames without ringing. Alternatively, it may be formed in a separate framework or holder, providing precise positioning for interrogating gases in unconfined or loosely confined regions. Closed path sensor configurations measure circulation or swirl.

Takashita, U.S. Pat. No. 5,331,885 describes in an ultrasonic inspection system for inspecting the surface condition of an object or the existence or absence of internal defects in it by ultrasonically scanning the object with ultrasonic beams, which have been successively produced as a result of successive excitation of a number of array element oscillators ($10_1$–$10''$) arranged in a row, and then analyzing waves reflected by the object, reference data for individual ultrasonic beams (individual channels) are collected by ultrasonically scanning a reference material of defect-free uniform quality before ultrasonic inspection of the object. Correction values are prepared based on these reference data, and signals received by the ultrasonic scanning of the object are corrected by these correction values. According channels to the reference values of the individual channels are determined channel by channel. Using these ratios as correction values, they are multiplied to signals received through the corresponding channels. The products are used as data to be shown on a display unit. By these attenuation factors, signals received through the corresponding channels are attenuated at a sensitivity equalizer. Scattering in sensitivity among the individual channels can be eliminated by these correction means.

The prior art teaches the use of testing of building joints including ultrasonic testing of joint integrity. However, the prior art does not teach that a testing system may be made a part of a construction and function in such a manner as to provide information immediately after the building frame is shaken. The prior art does not teach a system that allow testing without a partial destruction of the building's walls or other parts to allow access to the structural joints. The present invention fulfills these needs and provides further related advantages as described in the following summary.

SUMMARY OF THE INVENTION

The present invention teaches certain benefits in construction and use which give rise to the objectives described below.

The present invention provides an apparatus and method for inspecting the welded structural joints in steel structures for the anticipation of weld failure without the application of any live forces being applied. The invention provides electromechanical test units fixed at the welded structural joints of a structure and wired to a test apparatus such as an ultrasonic test monitor. Such a monitor may be one of many that are in communication with a remote signal processor and test management computer so as to accomplish testing.

A primary objective of the present invention is to provide a building integrity testing apparatus for the anticipation of weld failure without the application of external loads or forces and method having advantages not taught by the prior art.

Another objective is to provide such an apparatus having permanent test fixtures as part of the construction of a building frame.

A further objective is to provide such an apparatus having permanent wiring for sending and receiving test signals from a test set.

A still further objective is to provide such an apparatus with remote management control and data processing.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawing illustrates the present invention. In such drawing

DETAILED DESCRIPTION OF THE INVENTION

Figure 1:
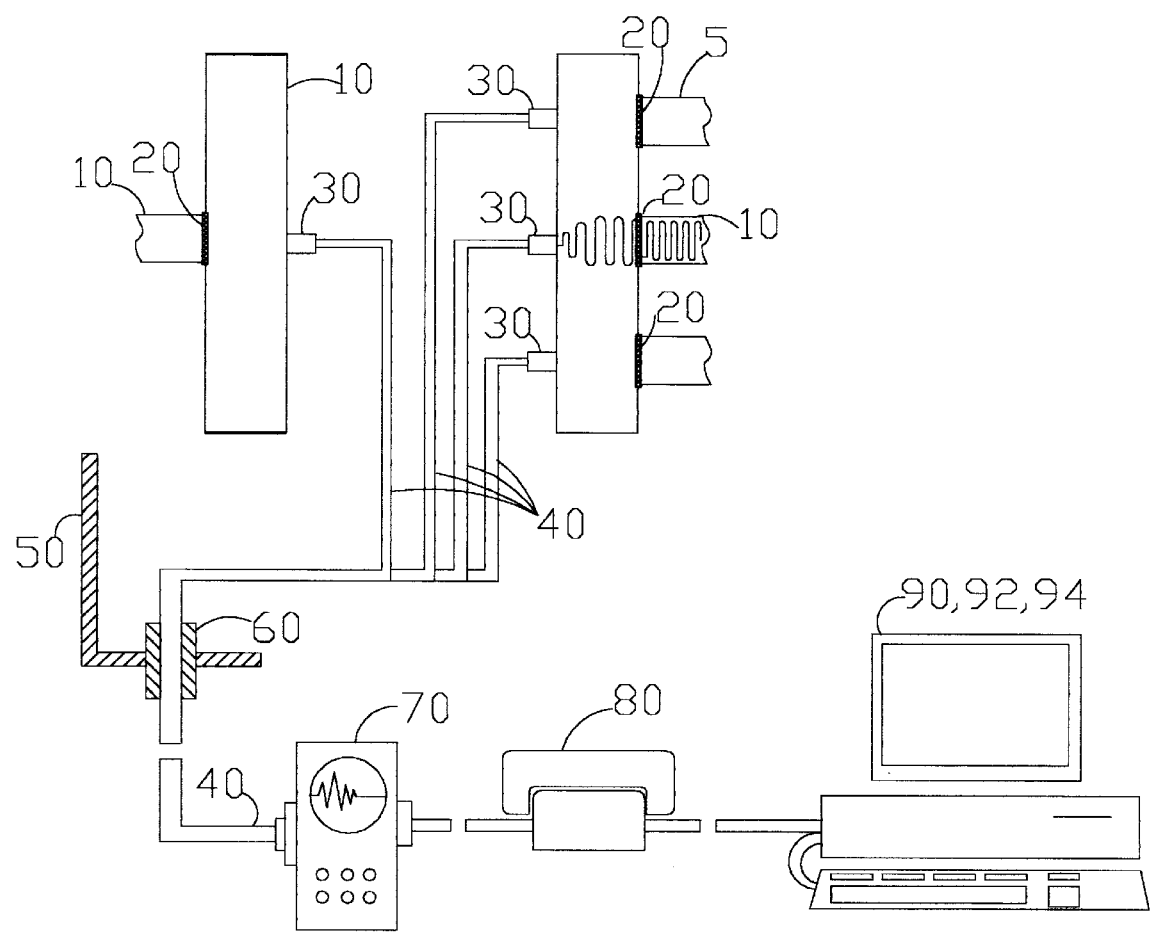
FIG. 1 is a block diagram describing the apparatus of the present invention.

The above described drawing figure illustrates the invention, a combination metallic building frame structural and integrity monitoring apparatus for the anticipation of weld failure without the application of external loads or forces, the combination comprising:

a metallic building frame 5 comprising a plurality of structural elements 10 such as steel girders, the structural elements 10 being joined by structure joining means 20 such as welds as shown or rivets, or other common building technique;

a plurality of electromechanical transducers 30, each of the electromechanical transducers 30 being joined with the metallic building frame 5 at one of the structure joining means 20;

a plurality of electrical signal transmission means 40 preferably either electrical cables or wireless links, each of the means being in electrical communication with one of the electromechanical transducers 30 for transmitting a testing signal to the electromechanical transducer 30 and for transmitting a test results signal from the electromechanical transducer 30;

a test results signal interpretation and display means 70 interconnected with the plurality of electromechanical transducers 30 by the plurality of electrical signal transmission means 40.

Preferably, the electrical signal transmission means 40 are coaxial cables for low EMF interference and for low loss signal transmission, the cables 40 being placed within tubular cable conduit conduction means 60 for gaining access to an interior operating space of the building frame 5 for operation of the test results signal interpretation and display means 70.

Preferably, the invention further includes a phone line transmission means 80, such as a modem, for two-way communication between the test results signal interpretation and display means 70 and a central monitoring station data processor 90, preferably a programmable computer.

Preferably, the central monitoring station data processor 90 is programmed for automatic testing of the metallic building frame 5, the data processor 90 being enabled for sending operational commands to the test results signal interpretation and display means 70, again, by the modem 80 so as to enable the testing signals to the electromechanical transducers 30 for remote testing in anticipation of weld failure without the application of external loads or forces of the building element joining means 20.

Preferably, the data processor 90 is further enabled for receiving the test results signals from the test results signal interpretation and display means 70 so as to enable determination of the soundness of the metallic building frame 5 in anticipation of weld failure without the application of external loads or forces.

Preferably, the data processor 90 includes a comparitor means 92 for comparing the testing results signals from the test results signal interpretation and display means and a quality determination criteria stored in a memory means 94 thereof.

Preferably, the electromechanical transducer 30 is enabled for operating with ultrasonic signals, i.e., the transducer is an ultrasonic type transducer as is well known in the building integrity testing industry in anticipation of weld failure without the application of external loads or forces.

The method of the present invention, for remote monitoring of structural integrity in a building structure, comprising the steps of:

a) joining the plurality of electromechanical transducers 30 to a plurality of joints 20 in a building frame structure 5;

b) interconnecting the plurality of electromechanical transducers 30 to a test results signal interpretation and display means 70 with a plurality of permanent electrical signal transmission means 40;

c) initiating a test signal at the test results signal interpretation and display means 70;

d) transmitting the test signal to the plurality of electromechanical transducers 30;

e) testing the joints 20 with the test signal;

f) transmitting a test result signal from the electromechanical transducers 30 to the test results signal interpretation and display means 70;

g) transmitting the test results signal from the test results signal interpretation and display means 70 to a remote data processor 90 via modem 80.

Preferably, the method includes the step of initiating the testing at the data processor 90 in accordance with a predetermined integrity monitoring program schedule.

Preferably, the method includes the step of comparing the testing results signals from the test results signal interpretation and display means 70 with a quality determination criteria stored in a memory means 94 of the data processor 90.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A weld integrity inspection and evaluation apparatus for anticipation of weld failure not dependent upon external loads or forces for identifying structural weld failures, thus comprising:

a plurality of electromechanical transducers, each electromechanical transducer being permanently joined with selected structural welded joining means;

a plurality of electrical signal transmission means, each means being capable of electronic communication with each electromechanical transducer for transmitting a testing signal to an electromechanical transducer permanently mounted at each predetermined structural weld joint and for transmitting test results rebound signals from an electromechanical transducer back to a test signal generator and test results interpretation and display means;

a test signal generator and test results interpretation and display means interconnected with a plurality of electrical signal transmission means;

wherein each electromechanical transducer is enabled to receive and return predetermined electronic waveform patterns to ultrasonically test a structural weld for anticipation or for identification of weld failures without external load or force.

2. A method for inspection of structural integrity of welded structural joining means in a metallic framed structure for the anticipation of weld failure without the application of external forces or loads, the method comprising the steps of;

A) permanently joining a plurality of electromechanical transducers to a plurality of welded structural joining means in a metallic frame structure;

B) interconnecting a plurality of electromechanical transducers to a test signal generator and test results signal interpretation and display means with a plurality of permanently connected electrical signal transmission means;

C) initiating a predetermined test signal from a test signal generator and test results signal interpretation and display means;

D) transmitting a predetermined test signal to individually enable each electromechanical transducer;

E) test signal activation of individual electromechanical transducers for ultrasonic test wave pattern generation and resulting inspection wave pattern rebound signal of a welded structural joint;

F) transmitting an inspection wave pattern rebound signal from an electromechanical transducer to a test signal generator and test results signal interpretation and display means through interconnecting signal transmission means; wherein the inspection is being performed without external loads or forces.

3. The method of claim 2 further including an automatic initiation of test signal generation at the test signal generator and test results signal interpretation and display means in accordance with a predetermined weld testing schedule.

4. The combination of claim 1 wherein a test signal generator and test results interpretation and display means further includes a comparitor means for evaluating a current ultrasonic inspection electronic wave pattern rebound signal and a stored initial ultrasonic inspection electronic wave pattern rebound signal in conjunction with a predetermined quality criteria stored in a memory means of the test results signal interpretation and display means.

5. The combination of claim 1 further including a transmission means for two-way communication between a test signal generator and test results interpretation and display means and a remote data collection and processing means.

6. The combination of claim 5 wherein said remote data collection and processing means is preprogrammed for automatic signal generation so as to enable a test signal generator and test results interpretation and display means to enable a predetermined electromechanical transducer for ultrasonic testing of metallic frame welded structure joining means.

7. The combination of claim 5 wherein said remote data collection and processing means is further enabled for receiving test results rebound signals from a test signal interpretation and display means so as to remotely evaluate the soundness of metallic frame welded joining means.

8. The combination of claim 5 wherein the remote data collection and processing means includes a comparitor means for evaluating current inspection results rebound signals to the initial inspection results rebound signals in conjunction with a predetermined quality criteria stored in a memory means of the remote data collection and processing means.

* * * * *